(12) United States Patent
Gibson et al.

(10) Patent No.: US 8,867,117 B2
(45) Date of Patent: Oct. 21, 2014

(54) SINGLE-LAYER REFLECTIVE DISPLAY UTILIZING LUMINESCENCE

(75) Inventors: Gary Gibson, Palo Alto, CA (US); Stephen Kitson, Alveston (GB); Tim Taphouse, Thornbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/259,256

(22) PCT Filed: Oct. 28, 2009

(86) PCT No.: PCT/US2009/062290
§ 371 (c)(1),
(2), (4) Date: Sep. 23, 2011

(87) PCT Pub. No.: WO2011/053283
PCT Pub. Date: May 5, 2011

(65) Prior Publication Data
US 2012/0013972 A1    Jan. 19, 2012

(51) Int. Cl.
| | |
|---|---|
| G02F 1/29 | (2006.01) |
| G02B 26/08 | (2006.01) |
| G09G 5/02 | (2006.01) |
| G02F 1/1335 | (2006.01) |
| G02F 1/167 | (2006.01) |

(52) U.S. Cl.
CPC .... G02F 1/133514 (2013.01); G02F 1/133553 (2013.01); G02F 2202/046 (2013.01); G02F 1/167 (2013.01); G02F 2202/36 (2013.01); G02F 2203/055 (2013.01)
USPC ............ 359/267; 359/298; 345/696; 345/698

(58) Field of Classification Search
USPC ......... 359/290–292, 296, 298, 237, 242, 295, 359/204, 212.1, 212.2, 216, 639, 634, 618, 359/267; 345/102, 77, 107, 55, 88, 690, 345/698, 696; 349/144, 106
See application file for complete search history.

(56) References Cited

U.S. PATENT DOCUMENTS

| | | | |
|---|---|---|---|
| 5,639,615 A | 6/1997 | Selvin et al. | |
| 7,210,792 B2* | 5/2007 | Peterson et al. | ................ 353/79 |
| 2008/0259226 A1* | 10/2008 | Broer et al. | ....................... 349/1 |
| 2009/0009050 A1* | 1/2009 | Kanade et al. | ............... 313/484 |
| 2009/0140961 A1 | 6/2009 | Geisow et al. | |

FOREIGN PATENT DOCUMENTS

| | | |
|---|---|---|
| CN | 101256279 | 9/2008 |
| JP | 8006013 A | 1/1996 |
| JP | 1998207395 A | 8/1998 |
| JP | 1998233191 A | 9/1998 |

(Continued)

OTHER PUBLICATIONS

The extended European Search Report (Supplementary ESR) from the European Patent Office for foreign counterpart patent application No. EP09850954, dated Mar. 7, 2013 (6 pages).

(Continued)

*Primary Examiner* — Thomas K Pham
*Assistant Examiner* — Brandi Thomas

(57) ABSTRACT

A reflective display device has multiple display pixels. Each pixel has at least three color sub-pixels disposed side-by-side for three primary colors respectively. At least one color sub-pixel has a light shutter with adjustable transmission, a luminescent layer containing a luminescent material that emits light of a selected color, and a mirror for reflecting light corresponding to that selected color.

20 Claims, 4 Drawing Sheets

(56) References Cited

FOREIGN PATENT DOCUMENTS

| | | |
|---|---|---|
| JP | 2000047191 A | 2/2000 |
| JP | 2002-090723 | 3/2002 |
| JP | 2002107719 A | 4/2002 |
| JP | 2004004822 A | 1/2004 |
| JP | 2004020826 A | 1/2004 |
| JP | 2004163656 A | 6/2004 |
| JP | 2005062851 A | 3/2005 |
| JP | 2010508620 A | 3/2010 |
| JP | 2005-031294 A | 2/2014 |
| JP | 09-061854 A | 3/2014 |
| KR | 10-0210651 B1 | 7/2014 |
| WO | 2008063653 A1 | 5/2008 |
| WO | WO-2008/085210 A3 | 7/2008 |

OTHER PUBLICATIONS

List of References Cited in Japan Office Action dated Jul. 18, 2013 from the Japan Patent Office for foreign counterpart patent application in Japan, No. 2012-536770, (1 page).

"List of References Cited", in related JP application 2012-536770; mailed Dec. 26, 2013.

International Preliminary Report, mailed May 10, 2012, isued in related PCT application No. PCT/US2009/062290.

International Search Report and Written Opinion mailed Jun. 29, 2010, issued in related PCT application No. PCT/US2009/062290.

* cited by examiner

SINGLE-LAYER REFLECTIVE DISPLAY UTILIZING LUMINESCENCE

BACKGROUND

Reflective electronic displays are a new type of display that is gaining popularity. For instance, reflective displays have been used in electronic book readers. In contrast to conventional flat-panel displays that require their own light sources, reflective displays utilize ambient light for illumination to generate the displayed images. Thus, reflective displays can mimic the look of "ink-on-paper" printed materials such as book pages or newspaper prints, and are often referred to as "electronic paper" or "e-paper." Due to the use of ambient light for illumination, reflective displays have the significant advantages of lower power consumption compared to conventional displays, and the ability to be viewed under bright ambient light.

A major challenge in developing reflective displays is to provide good color without making the device structure overly complicated and difficult to manufacture. A number of reflective paper-like display technologies attempt to achieve satisfactory color by stacking several active device layers. Those techniques rely on subtracting, by absorption, a portion of the visible spectrum in each active layer and reflecting the remainder to create the desired color. Providing full color requires the ability to independently subtract portions of the incident visible spectrum corresponding to at least three primary colors such as RGB (red green blue) or CYM (cyan yellow magenta). In addition, a fourth layer is often required to enable black and white and/or provide grayscale. In some cases it may be possible to utilize fewer than four active layers to obtain full color because two primary colors may be achieved in one active layer. However, stacking even two active layers can be problematic. Multiple layers require multiple electronic backplanes and/or complicated vias. This leads to more difficult manufacture, lower yields, and greater cost. The use of multiple layers also degrades device performance. Stray reflectance at interfaces and absorption in the stacked layers due to less than perfect transparency reduce contrast and brightness.

An alternative to stacking active layers is to try to achieve full color through the use of sub-pixels, each of which provides a primary color by reflecting only a narrow band of that color in the incident light. The problem with this approach is that only a small fraction of the pixel area is used for creating each primary color, and the incident light falling outside the sub-pixel is wasted. This leads to unacceptably low luminance levels. Also, some technologies, such as the front-back electrophoretic displays, have the problem that the "off" color is still partially visible when the "on" color particles are pulled to the front of the pixel. To date, no existing single-layer reflective display technology has demonstrated acceptable color.

BRIEF DESCRIPTION OF THE DRAWINGS

Some embodiments of the invention are described, by way of example, with respect to the following figures.

DETAILED DESCRIPTION

Figure 1:
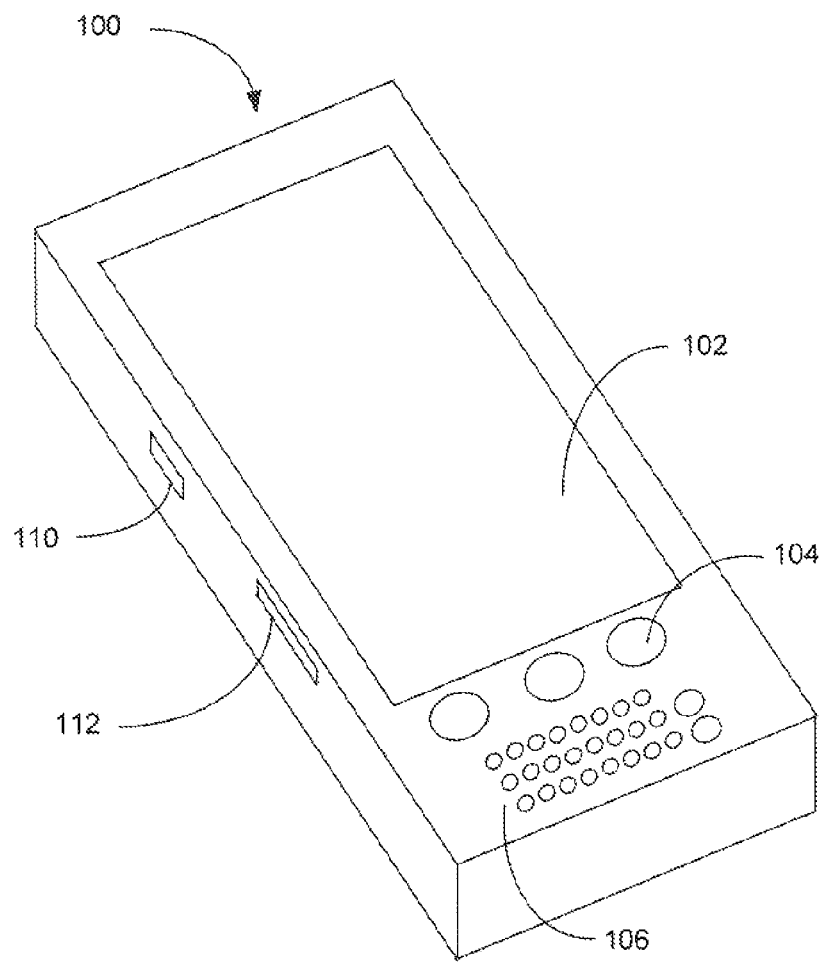
FIG. 1 is a schematic view of a reflective display device constructed according to an embodiment of the invention.

FIG. 1 shows an embodiment of a display device in accordance with the invention. As described in greater detail below, the display device 100 has a color display screen 102 that is capable of displaying images of high color quality while being simple in structure and easy to manufacture.

The device 100 has a built in power source, such as a rechargeable battery, and has electronic circuitry and software for its operations. As illustrated in FIG. 1, the device 100 may have buttons 104 for controlling image display functions and may have a keypad 106 for data entry. Moreover, the display screen 102 may be a touch-screen that can display control features such as scroll bars or control buttons. The display device 100 further includes means for receiving data of images to be displayed. For instance, the device 100 may have USB ports 110 for receiving data transmitted through a USB cable, or to receive a USB memory stick with the image date stored thereon. The device may also have, receptacles, such as an SD card slot 112, for other types of data storage devices. Alternatively, the device 100 may have wireless transmission capabilities for wirelessly downloading image data from at computer or a network such as the internet.

Figure 2:
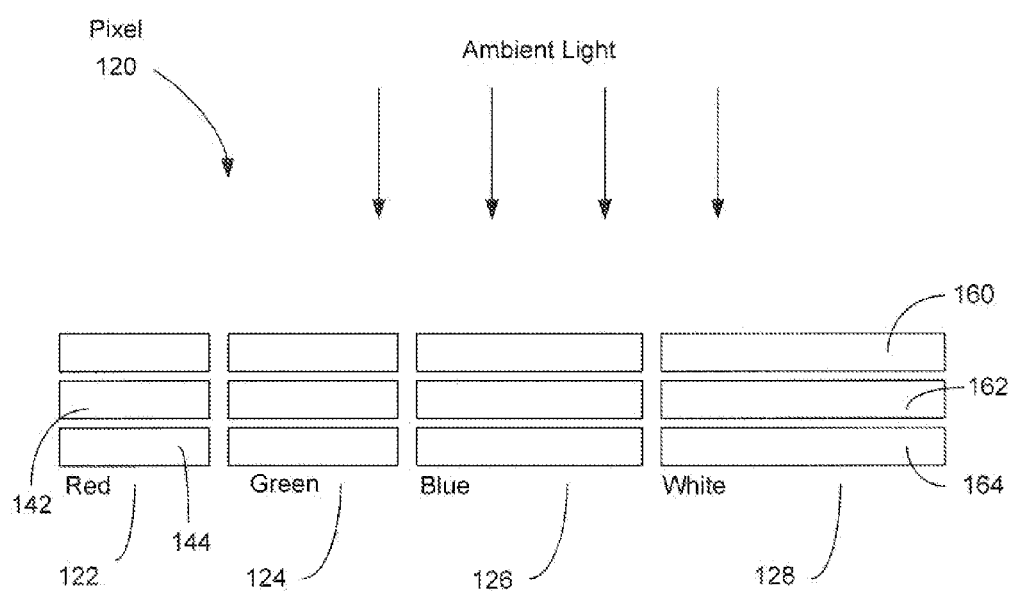
FIG. 2 is a schematic cross-sectional view of a pixel of the reflective display device of FIG. 1.

FIG. 2 shows a schematic representation of a pixel 120 of the display screen 102 in accordance with an embodiment of the invention. The pixel 120 has a plurality of sub-pixels, each of which is responsible for modulating the light generated in a given spectral band. In the example shown, the pixel 120 has three sub-pixels 122, 124, and 126 for modulating the three primary colors red, green, blue, respectively, and an optional sub-pixel 128 for modulation of white light. Other color choices and different numbers of sub-pixels could be used. This pixel structure is a "single-layer" structure, because the sub-pixels are disposed side-by-side in the same layer, in contrast to reflective display structures that have multiple active color absorption/reflection layers stacked together.

Figure 3:
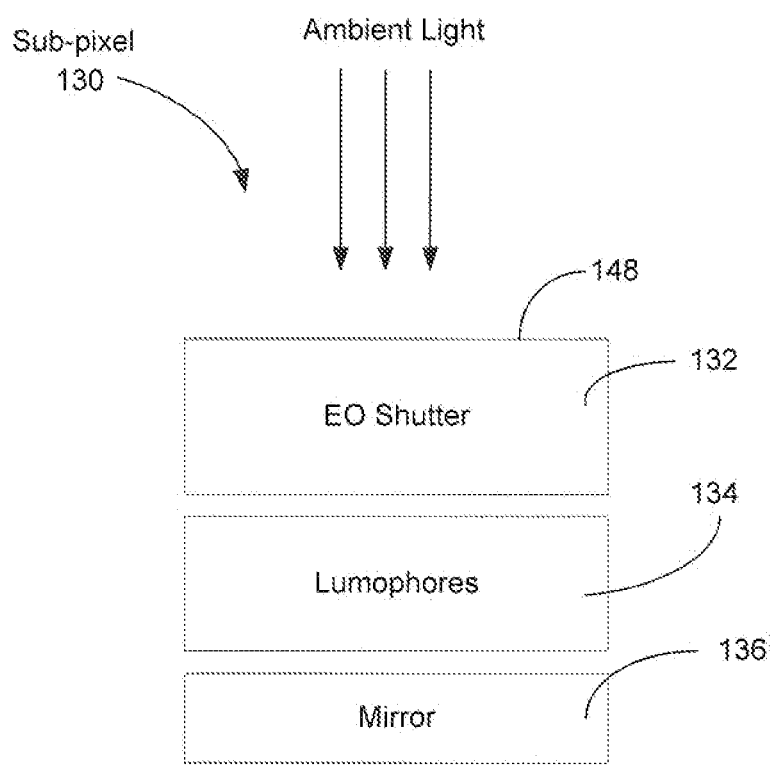
FIG. 3 is a schematic cross-sectional view of a color sub-pixel in the pixel of FIG. 2.

For clarity of description, FIG. 3 shows the structure of one color sub-pixel 130 in accordance with an embodiment of the invention. This sub-pixel structure may apply to all three color sub-pixels 122, 124, 126 in the pixel of FIG. 2. The sub-pixel 130 is formed of the components: a shutter 132, a luminescent layer 134, and a mirror 136. The shutter 132 forms the top layer of the color sub-pixel 130, and ambient light for illumination enters the sub-pixel through the shutter. The shutter has a light transmission that is adjustable. The shutter 132 modulates the intensity of ambient light entering the sub-pixel 130 and also the light leaving the sub-pixel. In this way, the shutter 132 controls the amount of light produced by the sub-pixel to achieve the desired brightness. In some embodiments, the shutter 132 comprises an electro-optic shutter, the transparency of which can be modulated from mostly transparent to mostly opaque, over some range of wavelengths and with some number of intermediate gray levels. There are a number of possible choices for the electro-optic shutter, including black/clear dichroic-liquid crystal (LC) guest-host systems and in-plane electrophoretic (EP) systems. If a dichroic LC system is used, in some embodiments, a quarter-wave plate may be disposed between the liquid crystal shutter and the luminescent material to provide absorption of both polarizations of light. Other options include cholesteric liquid crystal cells or electrowetting layers.

The luminescent layer 134 is disposed below the shutter layer 132. The luminescent layer 134 contains a luminescent material that contains lumophores for a selected color. Generally, a lumophore is an atom or atomic grouping in a chemical compound that manifests luminescence. The lumophores can be contained in either a solid film or a liquid dispersion in the luminescence layer. Lumophores usable for the display sub-pixels include organic and inorganic dyes and phosphors, semiconducting nanocrystals, and pigment particles utilizing any of these. If the lumophores are embedded in a solid or liquid matrix, the matrix material should be substantially transparent at wavelengths that are to be absorbed or emitted by the lumophores.

Below the lumophore layer 134 is a mirror 136 that reflects a selected portion of the optical spectrum. This mirror 136 can be for example, a Bragg stack, an absorbing dye over a broadband mirror, or a layer of optical scatterers such as plasmonic particles. The latter two options may be beneficial in terms of the ease with which mirrors with different reflection bands can be manufactured in a side-by-side sub-pixel configuration. They also may be chosen for their reduced dependence on the angle of incidence of the ambient light.

Figure 4:
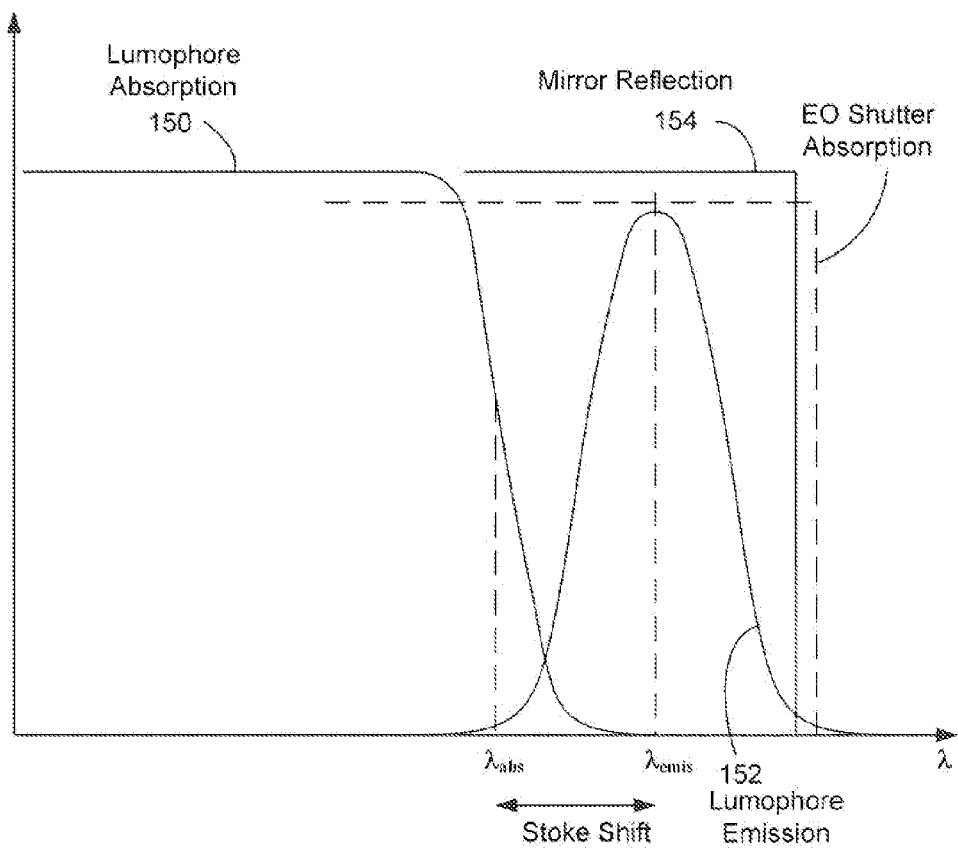
FIG. 4 is a plot showing the luminescent absorption and emission of a color sub-pixel as a function of light wavelength in an embodiment of the invention.

FIG. 4 shows the relationship between the absorption band 150 and the emission band 152 of the lumophores as a function of wavelength. As shown in FIG. 4, the lumophores absorb light with wavelengths up to an absorption edge, $\lambda_{abs}$. A substantial fraction of the absorbed energy will be re-radiated by the lumophores in a band around an emission wavelength $\lambda_{emis}$ that is longer than the absorption edge. This provides a large advantage in efficiency over devices that merely reflect a portion of the spectrum of the incident light. A large fraction of the incident energy at all wavelengths below the absorption wavelength (including UV) can be utilized rather than just the small portion that falls within the particular color band. In the case of a red sub-pixel, this can provide a several-fold improvement in brightness for a given sub-pixel area. In general, it is desirable to use lumophores whose absorption extends from some cutoff, $\lambda_{abs}$, down to the shortest wavelengths available in typical ambient environments. In practice, there might be negligible benefit in absorbing much below 320 nm, although somewhat shorter wavelengths may contribute in outdoor environments if the top layers of the device are reasonably transparent in this region.

The mirror 136 is wavelength-selective in that it reflects only light in a selected bandwidth. The reflection bandwidth may be chosen so that the mirror 136 reflects light of the primary color of the sub-pixel but does not reflect the other two primary colors. For instance, the mirror 144 for the red pixel 122 in FIG. 2 reflects red light but may not reflect any green or blue portion of the incident light that is not completely absorbed by the luminescent layer 142. The mirror 136 enhances the performance of the color sub-pixel 130 in two regards. First, it re-directs light that is emitted by the lumophores away from the viewing surface 148. By reflecting the emitted light back toward the viewing surface 148, the total amount of light from the sub-pixel 130 available for viewing can be significantly increased. In this regard, with a reasonable Stokes shift ($\lambda_{emis}-\lambda_{abs}$ in FIG. 4) separating the absorption edge and the emission wavelength, the lumophores will not significantly re-absorb the reflected emitted light as it passes back through them and out of the viewing surface.

Second, the wavelength-selective mirror 136 enables one to take optimum advantage of the portion of incident ambient light not significantly absorbed by the lumophores. This portion, which includes light with wavelengths between $\lambda_{abs}$ and $\lambda_{emis}$ (i.e., within the Stoke shift range) and beyond $\lambda_{emis}$, will reach the mirror 136. Some of this light may then be reflected back toward the viewing surface so that it contributes to the overall output of the sub-pixel. Without the mirror 136, this light is wasted. In some embodiments, the reflection band 154 of the mirror 136 is chosen such that it starts at a cut-off wavelength greater than the emission wavelength, and extends to shorter wavelengths that include the absorption edge wavelength $\lambda_{abs}$ of the lumophores. The long-wavelength cut-off of the mirror reflection may be set at the long-wavelength edge of the color band assigned to that sub-pixel. For a red sub-pixel, the reflection band may reach or even go beyond the long-wavelength edge of the standard range of red, as it may be desirable to reflect red out to the limits of human perception.

In the case of the red sub-pixel 122, the reflection of the mirror 144 in the Stoke shift range can be particularly important, as it may be desirable to use lumophores with a relatively large Stokes shift. This is because the peak of the human photopic response is at 555 nm (green). Consequently, any ambient light with a wavelength longer than 555 nm absorbed by the lumophores is converted to a wavelength ($\lambda_{emis}$) to which humans are less sensitive. Thus, it may be desirable in some cases to simply reflect wavelengths that are somewhat shorter than yet longer than 555 nm. The optimal Stokes shift depends on the internal photoluminescence (PL) efficiency of the lumophores, the chosen value of $\lambda_{emis}$, and the desired color gamut of the device. For instance, reflecting rather than converting wavelengths that are too short may shift the red color point toward yellow. On the other hand, converting rather than reflecting may result in decreased brightness if the conversion efficiency is not high enough. In this regard, due to the diminishing human photopic response at long wavelengths, in some embodiments the emission wavelength $\lambda_{emis}$ of the red lumophores in the red luminescent layer 142 may be chosen to be the shortest wavelength that gives a desirable red.

In contrast, in the case of the blue sub-pixel 126, a small Stokes shift may be desirable if the quantum efficiency of the lumophore is reasonably high. This is because the lumophore is converting light to a wavelength to which humans are more sensitive. For the same reason, it may also be desirable to choose a blue emission wavelength that is as long as possible while maintaining a color point that is not too green. For a given Stokes shift, a longer emission wavelength allows more of the ambient spectrum to be absorbed and utilized. In some embodiments, if the product of the emission and out-coupling efficiencies is not satisfactorily high, it may even be more desirable to just reflect the blue wavelengths by the wavelength-selective mirror instead of using luminescence. In that case, the blue sub-pixel may have a transparent middle layer between the shutter and the mirror, instead of a luminescent layer with blue lumophores.

By setting the transparency of the shutter layers 132 of the sub-pixels to various intermediate values, both the effective color and lightness of the overall pixel can be adjusted over a wide color gamut. If the emission wavelengths, reflected wavelengths, and areas of the three colored sub-pixels are properly chosen, they can display a color close to white when their shutters are in the fully clear state. Nevertheless, even with fairly high internal emission efficiencies, the lightness and color point of the white state may be inadequate for some purposes. In that case, an optional white sub-pixel 128 can be included to improve the lightness and color point of the white state of the display. The white sub-pixel has a shutter 160 for light amplitude modulation and a mirror 164 for light reflection. Unlike the color sub-pixels 122, 124, 126, the intermediate layer 162 of the white pixel 128 is a transparent material and does not contain lumophores, and the mirror 164 of the white pixel is a broad-band mirror capable of reflecting white light. It should be noted that the improvement in the lightness of the white state is done at the expense of the extent of the color gamut of pixel in the a* and b* dimensions of the CIE 1976 (L*, a*, b*) color space. The areas of the color sub-pixels and the white sub-pixel can be chosen to optimize the tradeoff between L*/ΔL* and the width of the color gamut in the a* and b* dimensions.

There are many types of lumophores that may be used in the luminescent layer of the sub-pixel 130. They include organic luminescent polymers, oligomers, small molecules (e.g. dyes) and inorganic nanocrystals or phosphors. These materials can be used in thin film form, embedded in other materials in the form of as composite, or bound in pigment particles. They can also be incorporated in a liquid layer in the form of a colloid/dispersion/suspension. The use of solvent-based lumophores can, in some cases, mitigate issues with concentration quenching. Dyes such as sulphorhodamine 101 are known to have nearly 100% internal quantum efficiency in solution. The emission efficiency of many polymers and oligomers can also be quite high, even in thin film form. Semiconducting nanocrystals can have greater than 80% quantum efficiency, although ~50% is more typical. Semiconducting nanocrystals are robust and offer the ability to absorb light over a wide range of wavelengths below their absorption edge. Moreover, the emission spectra of semiconducting nanocrystals can be quite narrow, less than 25 nm FWHM some cases. In some embodiments of the invention, lumophores with narrow emission bands, such as semiconducting nanocrystals, may be used to obtain highly saturated colors.

To engineer a desired combination of absorption spectrum, emission spectrum, and Stokes shift, combinations of lumophores with sensitizers can be used. For example, in some embodiments, an absorbing dye can be combined with lumophores so that the absorbing dye (sensitizer) absorbs in some wavelength band and then transfers the energy to the lumophores via a process such as Förster exchange.

In some other embodiments, the luminescent material may be up-converting lumophores so as to take advantage of the energy available in longer wavelengths, including the infrared. The up-converting lumophores absorb light with wavelengths longer than the desired color band for a given sub-pixel, and emit light within that color band.

In general, it is easier to manufacture devices with fewer layers. Consequently, it may be beneficial, for example, to incorporate any lumophore layers that are used onto either the electro-optical shutter substrates or the wavelength-selective mirrors, being careful not to put them too close to metal layers that could quench the luminescence, which might occur at distances less than about 100 nm.

The single-layer luminescent approach as described above provides greater lightness than non-luminescent single layer reflective display technologies, because it uses a much larger fraction of the available ambient spectrum. In addition, the use of appropriate lumophores with narrow emission spectra can provide more saturated colors than are available in conventional reflective display technologies. The brighter, larger color gamuts enabled by the present invention make single-layer reflective displays commercially viable, whereas conventional single layer reflective display technologies are not viable because they are fundamentally limited to extremely dim color gamuts.

In the foregoing description, numerous details are set forth to provide an understanding of the present invention. However, it will be understood by those skilled in the art that the present invention may be practiced without these details.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A reflective display pixel comprising:
   at least three sub-pixels disposed side-by-side, each of the sub-pixels corresponding to one of three primary colors, at least one of the sub-pixels having:
   a light shutter with adjustable transmission;
   a luminescent layer disposed below the light shutter and containing a luminescent material that emits light of a selected primary color when illuminated by light received from the light shutter; and
   a mirror disposed below the luminescent layer to reflect light corresponding to the selected primary color emitted by the luminescent layer, the light being reflected in a direction toward the light shutter to pass through the luminescent layer,
   wherein the luminescent layer is sandwiched between the light shutter and the mirror.

2. A reflective display pixel as in claim 1, wherein the three primary colors include red, blue and green.

3. A reflective display pixel as in claim 1, wherein the mirror of the at least one sub-pixel has a selected range of reflection that includes a band between an emission wavelength and an absorption edge wavelength of the luminescent material of the sub-pixel.

4. A reflective display pixel as in claim 1, wherein the shutter is selected from the group of a dichroic guest-liquid crystal host system and an in-plane electrophoretic system.

5. A reflective display pixel as in claim 1, wherein the luminescent material includes semiconducting nanocrystals.

6. A reflective display pixel as in claim 1, wherein the luminescent material includes a sensitizer material for absorbing light and transferring energy to the luminescent material to emit light of the selected primary color.

7. A reflective display pixel as in claim 1, further including a white sub-pixel comprising a light shutter and a mirror for reflecting white light.

8. A reflective display pixel as in claim 1, wherein the mirror is selected from the group of a Bragg stack, an absorbing dye over a broadband mirror, and a layer of optical scatterers.

9. A reflective display device comprising:
   a plurality of pixels, each pixel having at least three sub-pixels disposed side-by-side, each of the sub-pixels corresponding to one of three primary colors, at least one of the sub-pixels having:
   a light shutter with adjustable transmission;
   a luminescent layer disposed below the light shutter and containing a luminescent material that emits light of a selected primary color; and
   a mirror disposed below the luminescent layer for reflecting light corresponding to the selected primary color.

10. A reflective display device as in claim 9, wherein the three primary colors include red, blue and green.

11. A reflective display device as in claim 9, wherein the mirror of the at least one sub-pixel has a selected range of reflection that includes a range between an emission wavelength and an absorption edge wavelength of the luminescent material of the sub-pixel.

12. A reflective display device as in claim 9, wherein the shutter is selected from the group of a dichroic guest-liquid crystal host system and an in-plane electrophoretic system.

13. A reflective display device as in claim 9, wherein the luminescent material includes a sensitizer material for absorbing light and transferring energy to the luminescent material to emit light of the selected primary color.

14. A reflective display device as in claim 9, wherein each pixel further includes a white sub-pixel comprising a light shutter and a mirror for reflecting white light.

15. A reflective pixel comprising:
- a shutter layer adjacent to a first side of the reflective pixel, the shutter layer comprising an electro-optic shutter to modulate an intensity of light passing through the shutter layer;
- a luminescent layer disposed below the shutter layer, the luminescent layer comprising a luminescent material to emit light of a selected color when illuminated by light received from the shutter layer; and
- a reflective layer disposed below the luminescent layer and adjacent to a second side of the reflective pixel opposite the first side; the reflective layer comprising a mirror to reflect light emitted by the luminescent layer, the light being reflected in a direction away from the second side and toward the first side of the reflective pixel.

16. The reflective pixel of claim 15, wherein the selected color comprises a selected one of three primary colors of red, green and blue.

17. The reflective pixel of claim 15, wherein the mirror of the reflective layer has a selected range of reflection that includes a range between an emission wavelength and an absorption edge wavelength of the luminescent material.

18. The reflective pixel of claim 15, wherein the mirror comprises one or more of a Bragg stack, an absorbing dye over a broadband mirror, and a layer of wavelength-selective optical scatterers.

19. A reflective display system comprising a plurality of pixels, each pixel corresponding to a selected one of three primary colors, at least one of the pixels of the plurality comprising the reflective pixel of claim 15.

20. The reflective display system of claim 19, further comprising at least one white reflective pixel, the white reflective pixel comprising:
- a shutter layer adjacent to a first side of the white reflective pixel, the shutter layer comprising an electro-optic shutter to modulate an intensity of light passing through the shutter layer; and
- a reflective layer disposed adjacent to a second side of the reflective pixel opposite the first side; the reflective layer comprising a mirror to reflect white light received from the shutter layer, the white light being reflected in a direction away from the second side and toward the first side of the white reflective pixel.

* * * * *